(12) United States Patent
Zhang et al.

(10) Patent No.: US 10,416,821 B2
(45) Date of Patent: Sep. 17, 2019

(54) TOUCH SUBSTRATE, TOUCH DISPLAY PANEL AND TOUCH DISPLAY APPARATUS HAVING THE SAME, AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Youting Zhang, Beijing (CN); Taofeng Xie, Beijing (CN); Kefeng Li, Beijing (CN); Ting Zeng, Beijing (CN); Haifeng Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 183 days.

(21) Appl. No.: 15/533,143

(22) PCT Filed: Jul. 4, 2016

(86) PCT No.: PCT/CN2016/088348
§ 371 (c)(1),
(2) Date: Jun. 5, 2017

(87) PCT Pub. No.: WO2018/006231
PCT Pub. Date: Jan. 11, 2018

(65) Prior Publication Data
US 2018/0348902 A1    Dec. 6, 2018

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .................. G06F 3/044; G06F 3/0414; G06F 2203/04111; G06F 2203/04103
See application file for complete search history.

(56) References Cited

U.S. PATENT DOCUMENTS 9,164,639 B2 * 10/2015 Chen ........................ G06F 3/044
9,483,132 B2 * 11/2016 Her ........................ G06F 3/041
(Continued)

FOREIGN PATENT DOCUMENTS

CN    202533920 U    11/2012
CN    103092414 A    5/2013
(Continued)

OTHER PUBLICATIONS

International Search Report & Written Opinion dated Mar. 31, 2017 regarding PCT/CN2016/088348.
(Continued)

*Primary Examiner* — Vijay Shankar
(74) *Attorney, Agent, or Firm* — Intellectual Valley Law, P.C.

(57) ABSTRACT

The present application discloses a touch substrate having a display area and a peripheral area abutting the display area for bonding circuit parts, including a base substrate; a touch signal line layer having a plurality of transparent touch signal lines on the base substrate in the display area, the plurality of transparent touch signal lines extending across at least a portion of the display area into the peripheral area; an insulating layer on a side of the touch signal line layer distal to the base substrate; and a touch electrode layer having a
(Continued)

plurality of transparent touch electrodes in the display area on a side of the insulating layer distal to the touch signal line layer.

15 Claims, 15 Drawing Sheets

(56) References Cited

U.S. PATENT DOCUMENTS

| | | |
|---|---|---|
| 2010/0265206 A1 | 10/2010 | Chen |
| 2014/0182894 A1 | 7/2014 | Liu et al. |
| 2014/0204290 A1 | 7/2014 | Chen et al. |
| 2015/0070312 A1 | 3/2015 | Her et al. |
| 2016/0342253 A1 | 11/2016 | Sun et al. |
| 2016/0378240 A1 | 12/2016 | Li et al. |

FOREIGN PATENT DOCUMENTS

| | | |
|---|---|---|
| CN | 104423715 A | 3/2015 |
| CN | 104536610 A | 4/2015 |
| CN | 104571758 A | 4/2015 |
| CN | 104615323 A | 5/2015 |
| EP | 2584437 A2 | 4/2013 |
| KR | 20150002389 A | 1/2015 |
| WO | 2015109601 A1 | 7/2015 |
| WO | 2015164056 A1 | 10/2015 |

OTHER PUBLICATIONS

Extended European search report in the European Patent Application No. 16907679.1, dated Dec. 17, 2018.

\* cited by examiner

TOUCH SUBSTRATE, TOUCH DISPLAY PANEL AND TOUCH DISPLAY APPARATUS HAVING THE SAME, AND FABRICATING METHOD THEREOF

CROSS-REFERENCE TO RELATED APPLICATION

This application is a national stage application under 35 U.S.C. § 371 of International Application No. PCT/CN2016/088348 filed Jul. 4, 2016, the contents of which are incorporated by reference in the entirety.

TECHNICAL HELD

The present invention relates to touch display technology, more particularly, to a touch substrate, a touch display panel and a touch display apparatus having the same, and a fabricating method thereof.

BACKGROUND

In recent years, touch devices have been widely used in many electronic devices such as mobile phones, computer display panels, touch screens, satellite navigation devices, digital cameras, etc. Examples of touch devices include a mutual-capacitance touch control device and a self-capacitance touch control device. In a mutual-capacitance touch control device, the touch electrodes include multiple touch scanning electrodes (Tx) and multiple touch sensing electrodes (Rx). In a self-capacitance touch control device, the touch electrode can achieve touch control function alone.

SUMMARY

One aspect, the present invention provides a touch substrate having a display area and a peripheral area abutting the display area for bonding circuit parts, comprising a base substrate; a touch signal line layer comprising a plurality of transparent touch signal lines on the base substrate in the display area, the plurality of transparent touch signal lines extending across at least a portion of the display area into the peripheral area; an insulating layer on a side of the touch signal line layer distal to the base substrate; and a touch electrode layer comprising a plurality of transparent touch electrodes in the display area on a side of the insulating layer distal to the touch signal line layer.

Optionally, the insulating layer comprises a plurality of vias, the plurality of transparent touch electrodes electrically connected to the plurality of touch signal lines through the plurality of vias in the insulating layer.

Optionally, a projection of the plurality of transparent touch signal lines on the base substrate overlaps with a projection of plurality of transparent touch electrodes in the display area.

Optionally, each of the plurality of transparent touch signal lines is individually addressable, and is electrically connected to each of the plurality of transparent touch electrodes through each of the plurality of vias in a one-to-one relationship.

Optionally, the touch electrode layer comprises a first touch electrode layer and a second touch electrode layer; the first touch electrode layer comprising a plurality of rows of first transparent touch electrodes; the second touch electrode layer comprising a plurality of columns of second transparent touch electrodes; each row of first transparent touch electrodes is electrically connected to one of the plurality of transparent touch signal lines; and each column of second transparent touch electrodes is electrically connected to one of the plurality of transparent touch signal lines.

Optionally, the touch electrode layer further comprises a first bridge layer comprising a plurality of first bridges and a second bridge layer comprising a plurality of second bridges; first transparent touch electrodes in each row are spaced apart from each other along a row direction; second transparent touch electrodes in each column are spaced apart from each other along a column direction; the row direction intersecting the column direction forming a plurality of intersections; two adjacent first transparent touch electrodes along the row direction are electrically connected at each intersection through a first bridge; and two adjacent second transparent touch electrodes along the column direction are electrically connected at each intersection through a second bridge.

Optionally, the second bridge layer is in a same layer as the first touch electrode layer and the second touch electrode layer; the first bridge layer is in a different layer from the first touch electrode layer and the second touch electrode layer.

Optionally, the touch substrate further comprises an ancillary insulating layer between the first bridge layer and the second bridge layer, insulating the plurality of first bridges from the plurality of second bridges at the plurality of intersections.

Optionally, the plurality of transparent touch signal lines are made of one or a combination of nano-silver, indium tin oxide, indium zinc oxide, indium gallium oxide, indium gallium zinc oxide, nano-carbon tube, and graphene Optionally, the peripheral area is an area abutting only one side of the display area.

In another aspect, the present invention provides a method of fabricating a touch substrate having a display area and a peripheral area abutting the display area for bonding circuit parts, comprising forming a touch signal line layer comprising a plurality of transparent touch signal lines on a base substrate in the display area, the plurality of transparent touch signal lines extending across at least a portion of the display area into the peripheral area; forming an insulating layer on a sick of the touch signal line layer distal to the base substrate; and forming a touch electrode layer comprising a plurality of transparent touch electrodes in the display area on a side of the insulating layer distal to the touch signal line layer.

Optionally, the step of forming the touch signal, line layer comprises forming a plurality of trenches on the base substrate, each of which corresponding to a transparent touch signal line; and depositing a transparent conductive material on the base substrate to fill the plurality of trenches.

Optionally, the method further comprises forming a plurality of vias in the insulating layer for electrically connecting the plurality of transparent touch electrodes with the plurality of touch signal lines, wherein each of the plurality of vias corresponds to each of the plurality of transparent touch signal lines and each of the plurality of transparent touch electrodes in a one-to-one relationship.

Optionally, the step of forming the touch electrode layer comprises forming a first touch electrode layer comprising a plurality of rows of first transparent touch electrodes; and forming a second touch electrode layer comprising a plurality of columns of second transparent touch electrodes; the step of forming the plurality of vias in the insulating layer comprising forming the plurality of vies for electrically connecting each row of first transparent touch electrodes to one of the plurality of transparent touch signal lines; and electrically connecting each column of second transparent touch electrodes to one of the plurality of transparent touch signal lines.

Optionally, the method further comprises forming a first bridge layer comprising a plurality of first bridges on a side of the insulating layer distal to the base substrate; forming an ancillary insulating layer on a side of the first bridge layer distal to the insulating layer; and forming a second bridge layer comprising a plurality of second bridges on a side of the ancillary insulating layer distal to the first bridge layer; wherein first transparent touch electrodes in each row are spaced apart from each other along a row direction; second transparent touch electrodes in each column are spaced apart from each other along a column direction; the row direction intersecting the column direction forming a plurality of intersections; two adjacent first transparent touch electrodes along the row direction are electrically connected at each intersection through a first bridge; and two adjacent second transparent touch electrodes along the column direction are electrically connected at each intersection through a second bridge.

Optionally, the peripheral area is an area abutting only one side of the display area.

Optionally, the method further comprises printing a black matrix in the peripheral area.

Optionally the plurality of transparent touch signal lines are made of one or a combination of nano-silver, indium tin oxide, indium zinc oxide, indium gallium oxide, indium gallium zinc oxide, nano-carbon tube, and graphene.

In another aspect, the present invention provides a touch display panel comprising a touch substrate described herein or fabricated by a method described herein.

In another aspect, the present invention provides a touch display apparatus comprising a touch display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1A:
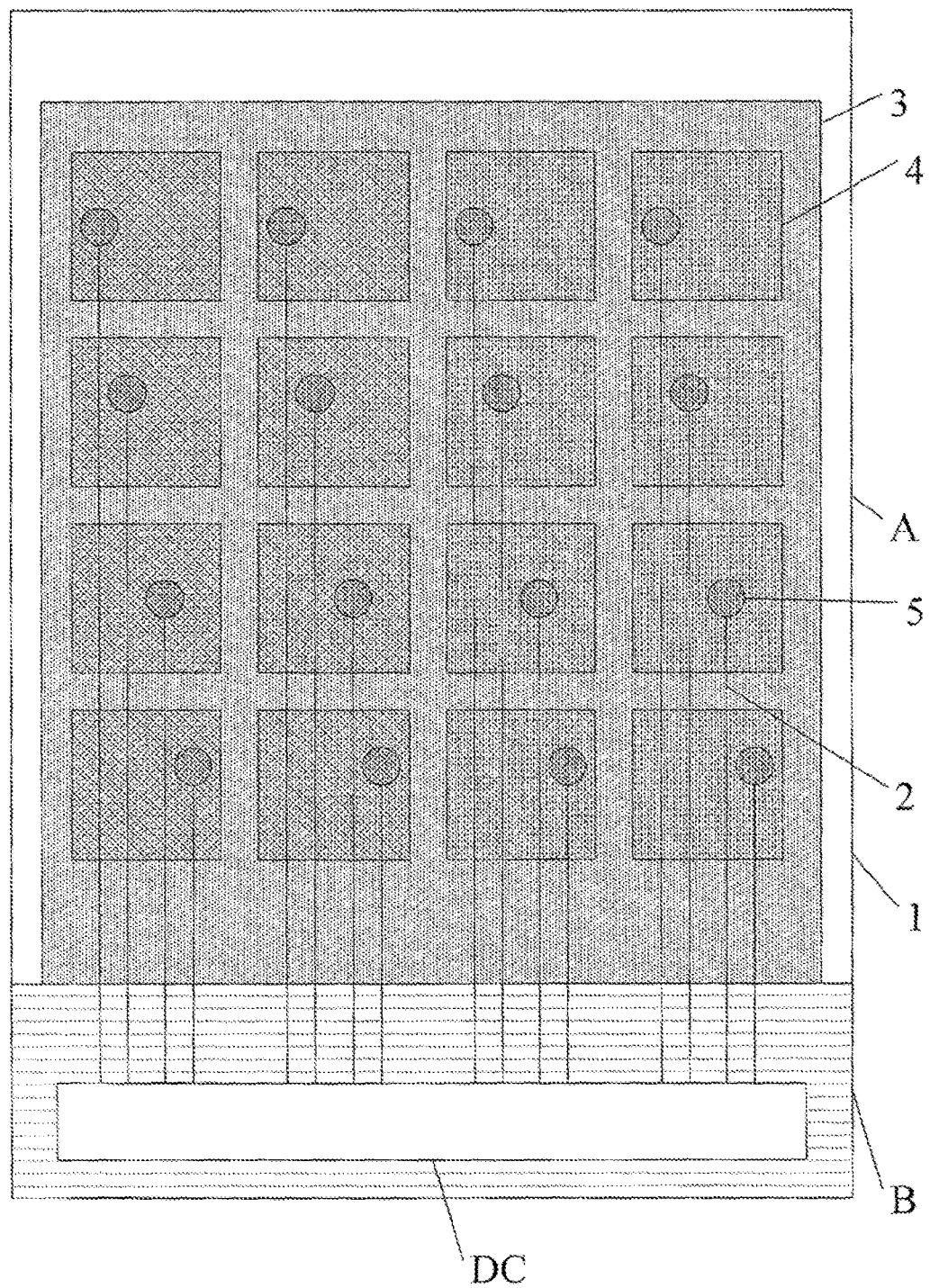
FIG. 1A is a diagram illustrating the structure of a touch substrate in some embodiments.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

In conventional touch substrates and touch display apparatuses, the touch signal lines for connecting an array of touch electrodes with a driving circuit are disposed in the peripheral areas. Because the touch signal lines are made of non-transparent metal material, a bezel disposed along all edges of the touch display apparatus is required to cover the metal lines in the peripheral areas.

The present disclosure provides a novel touch substrate and touch display apparatus having the same. In the present touch substrate and touch display apparatus, the touch signal lines are made of a transparent conductive material. Accordingly, it is not required to have a bezel in the peripheral areas to cover the reflective metal touch signal line. Because the touch signal lines are transparent, they may be disposed inside the display area without reducing the aperture ratio of the touch substrate. For example, in some touch substrates, all touch signal lines may extend across at least a portion of the display area into one single peripheral area (e.g., a peripheral area along one single edge of then display area) for connecting touch electrodes with a driving circuit. By having this design, three edges of the display area may be made frameless, i.e., the display apparatus includes a frame along only one edge of the touch substrate display area.

In some embodiments, the present touch substrate includes a display area and a peripheral area abutting the display area for bonding circuit parts. For example, the peripheral area may abut a portion of a periphery (e.g., only along one edge) of the display area. The touch signal lines, other metal lead wires, and driving circuits may be disposed within the peripheral area. In some embodiments, the touch substrate includes a base substrate; a touch signal line layer having a plurality of transparent touch signal lines on the base substrate in the display area, the plurality of transparent touch signal lines extending across at least a portion of the display area into the peripheral area; an insulating layer on a side of the touch signal line layer distal to the base substrate; and a touch electrode layer having a plurality of transparent touch electrodes in the display area on a side of the insulating layer distal to the touch signal line layer. Optionally, the touch substrate includes an insulating layer having a plurality of vias for electrically connecting the plurality of transparent touch electrodes to the plurality of touch signal line. The projection of the plurality of transparent touch signal lines on the base substrate overlaps with a projection of plurality of transparent touch electrodes in the display area.

As used herein, the term "display area" refers to an area of the display substrate where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting display. An inter-subpixel region refers to a region between adjacent subpixel regions, such as a region corresponding to a black matrix in a liquid crystal display or a region corresponding a pixel definition layer in an organic light emitting display. Optionally, the inter-subpixel region is a region between adjacent subpixel regions in a same pixel. Optionally, the inter-subpixel region is a region between two adjacent subpixel regions from two adjacent pixels. As used herein the term "peripheral area" refers to an area where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas.

Figure 1B:
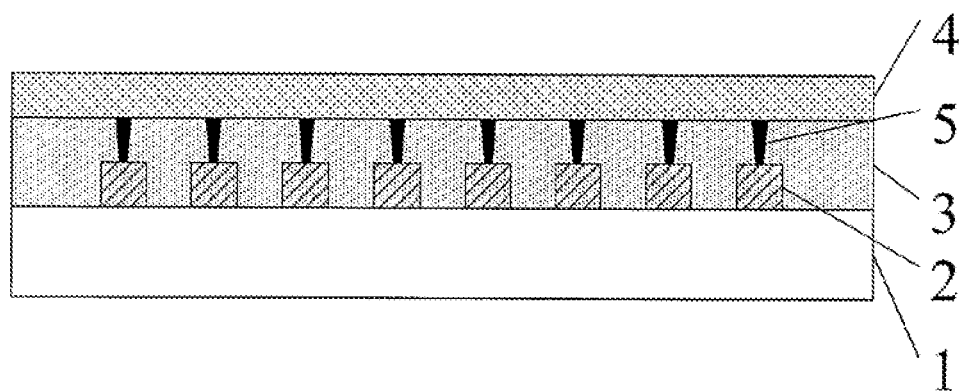
FIG. 1B is a cross-sectional view of a touch substrate in some embodiments.

FIG. 1A is a diagram illustrating the structure of a touch substrate in some embodiments. FIG. 1B is a cross-sectional view of a touch substrate in some embodiments. Referring to FIG. 1A and FIG. 1B, the touch substrates in the embodiments include a display area A and a peripheral area B abutting the display area A for bonding circuit parts. As shown in FIG. 1A and FIG. 1B, the touch substrates in the embodiments include a base substrate 1, a touch signal line layer including a plurality of transparent touch signal lines 2 on the base substrate 1 in the display area A, an insulating layer 3 on a side of the touch signal line layer distal to the base substrate 1, and a touch electrode layer 4 including a plurality of transparent touch electrodes in the display area A on a side of the insulating layer 3 distal to the touch signal line layer.

Referring to FIG. 1A and FIG. 1B, the touch substrates in the embodiments further include a plurality of vias 5 extending through the insulating layer 3. As shown in FIG. 1B, the plurality of transparent touch electrodes are electrically connected to the plurality of touch signal line 2 through the plurality of vias 5 in the insulating layer 3. As shown in FIG. 1A, a projection of the plurality of transparent touch signal lines 2 on the base substrate 1 overlaps with a projection of plurality of transparent touch electrodes in the display area A.

The touch substrate in FIG. 1A is a self-capacitance type touch substrate. In some self-capacitance type touch substrate, each electrode is individually addressable. For example, optionally, each of the plurality of touch signal lines is electrically connected to each of the plurality of transparent touch electrodes in a one-to-one relationship, and each touch signal line is connected to the driving circuit DC. Because each electrode must be individually addressed in this type of touch substrate, it is very challenging to implement this type of touch substrate using conventional reflective metal touch signal lines for large-size touch display panels (e.g., larger than 3.5 inches). By using transparent touch signal lines for connecting self-capacitance touch electrodes, large-size touch display panels may be made.

Figure 1C:
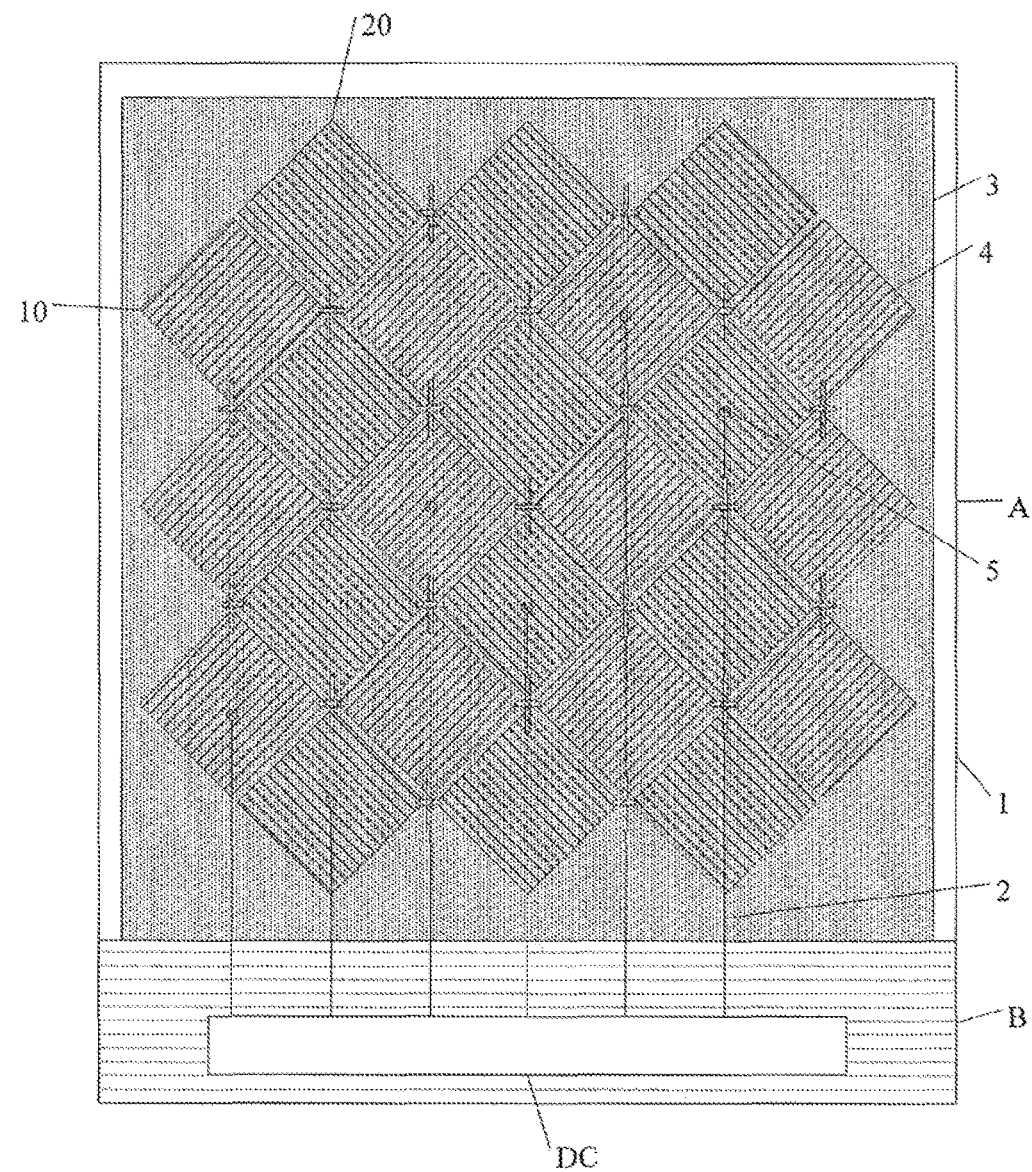
FIG. 1C is a diagram illustrating the structure of a touch substrate in some embodiments.

In some embodiments, the touch substrate is a mutual-capacitance type touch substrate. FIG. 1C is a diagram illustrating the structure of a touch substrate in some embodiments. Referring to FIG. 1C, the touch electrode layer 4 in the embodiment includes a first touch electrode layer 10 and a second touch electrode layer 20. As shown in FIG. 1C, the first touch electrode layer 10 includes a plurality of rows of first transparent touch electrodes, and the second touch electrode layer 20 includes a plurality of columns of second transparent touch electrodes. First transparent touch electrodes in each row are spaced apart from each other along a row direction; second transparent touch electrodes in each column are spaced apart from each other along a column direction; the row direction intersecting the column direction forming a plurality of intersections. For example, the first touch electrode may be a touch scanning electrode (Tx) and the second touch electrode may be a touch sensing electrode (Rx). Each row of first transparent touch electrodes may be connected with a touch scanning line and each column of second transparent touch electrodes may be connected with a touch sensing line. Mutual capacitance is created between rows of first transparent touch electrodes and columns of second transparent touch electrodes in the proximity of intersections. When a finger or an object touches near an intersection, some of the mutual capacitance between the row and column is coupled to the finger or the object thereby reducing the capacitance at the intersection. The touch location may be detected based on the change of mutual capacitance.

Figure 2:
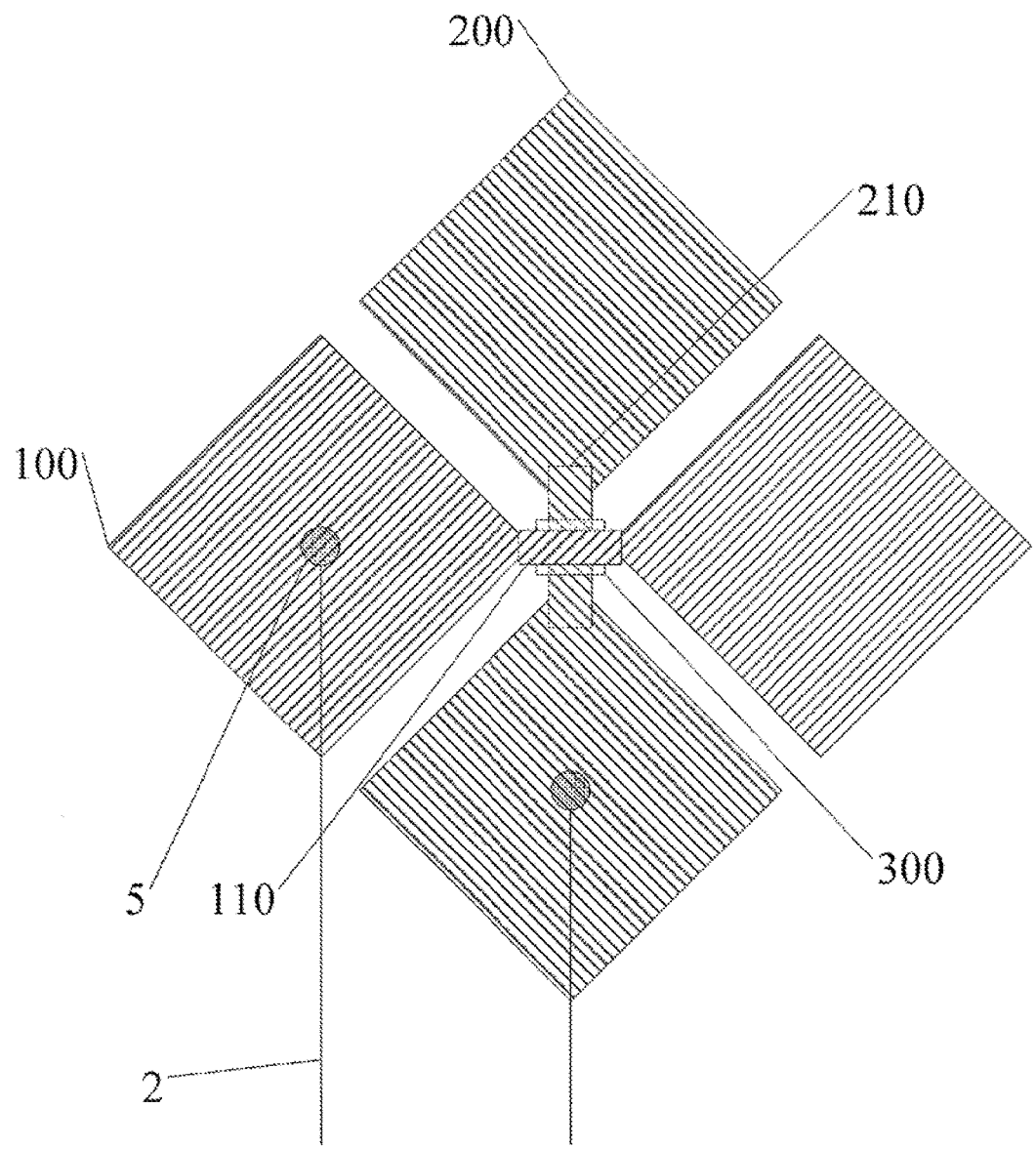
FIG. 2 is a diagram illustrating the connecting structure of a first touch electrode layer and a second touch electrode layer in some embodiments.

Adjacent first transparent touch electrodes are electrically connected at each intersection through a plurality of first bridges, and adjacent second transparent touch electrodes are electrically connected at each intersection through a plurality of second bridges. FIG. 2 is a diagram illustrating the connecting structure of a first touch electrode layer and a second touch electrode layer in some embodiments. Referring to FIG. 2, two adjacent first transparent touch electrodes along the row direction are electrically connected at each intersection through a first bridge 110, and two adjacent second transparent touch electrodes along the column direction are electrically connected at each intersection through a second bridge 210. The first bridge 110 and the second bridge 210 are electrically insulated by an ancillary insulating layer 300.

In some embodiments, the touch substrate includes a base substrate, a touch signal line layer on the base substrate in the display area, an insulating layer on a side of the touch signal line layer distal to the base substrate, a first touch electrode layer and a second touch electrode layer on a side of the insulating layer distal to the touch signal line layer. Optionally, the touch substrate further includes a second bridge layer having a plurality of second bridges in a same layer as the first touch electrode layer and the second touch electrode layer. Optionally, the touch substrate further includes a first bridge layer having a plurality of first bridges in a same layer as the first touch electrode layer and the second touch electrode layer. Optionally, the touch substrate further includes an ancillary insulating layer between the first bridge layer and the second bridge layer, insulating the plurality of first bridges from the plurality of second bridges at the plurality of intersections.

Optionally, the ancillary insulating layer is on a side of the second bridge layer distal to the insulating layer. Optionally, the first bridge layer is on a side of the ancillary insulating layer distal to the second bridge layer.

Optionally, the ancillary insulating layer is on a side of the second bridge layer proximal to the insulating layer. Optionally, the first bridge layer is on a side of the ancillary insulating layer distal to the second bridge layer.

Various appropriate materials may be used for making the transparent touch signal lines. Examples of transparent conductive materials suitable for making the transparent touch signal lines include, but are not limited to, nano-silver, indium tin oxide, indium zinc oxide, indium gallium oxide, indium gallium zinc oxide, nano-carbon tube, and graphene. Optionally, the transparent touch signal lines are made of nano-silver.

Various appropriate materials may be used for making the base substrate. Examples of materials suitable for making the base substrate include, but are not limited to, glass, quartz, polyimide, and polyester, etc.

Various appropriate materials may be used for making the transparent touch electrodes. Examples of transparent electrode materials suitable for making the transparent touch electrodes include, but are not limited to, indium tin oxide, indium zinc oxide, and tin oxide.

In another aspect, the present disclosure provides a method of fabricating a touch substrate (e.g., touch substrates in FIGS. 1A-1C). As discussed above, the present touch substrate includes a display area and a peripheral area abutting the display area for bonding circuit parts. For example, the peripheral area may abut a portion of a periphery (e.g., only along one edge) of the display area. In some embodiments, the method includes forming a touch signal line layer having a plurality of transparent touch signal lines on a base substrate in the display area, the plurality of transparent touch signal lines extending across at least a portion of the display area into the peripheral area; forming an insulating layer on a side of the touch signal line layer distal to the base substrate; and forming a touch electrode layer having a plurality of transparent touch electrodes in the display area on a side of the insulating layer distal to the touch signal line layer.

In some embodiments, the method further includes forming a plurality of vias in the insulating, layer for electrically connecting the plurality of transparent electrodes with the plurality of touch signal lines.

In some embodiments, the touch substrate is a self-capacitance type touch substrate. The touch electrode layer includes a plurality of touch electrodes, each of which is electrically connected to a transparent touch signal line in a one-to-one relationship. Optionally, the step of forming a plurality of vias in the insulating layer includes forming a plurality of vias in the insulating layer for electrically connecting each transparent electrode to each touch signal lines. Optionally, each transparent touch signal line, each via, and each transparent electrode are in a one-to-one relationship, i.e., each via only electrically connects one transparent touch signal line to one transparent electrode.

In some embodiments, the touch substrate is a mutual-capacitance type touch substrate. The step of forming the touch electrode layer includes forming a first touch electrode layer and forming a second touch electrode layer. Optionally, the first touch electrode layer and the second touch electrode layer are formed in a same layer. Optionally, the first touch electrode layer and the second touch electrode layer are formed in different layers. The first touch electrode layer and the second touch electrode layer may be formed by patterning a transparent electrode material layer, e.g., by etching.

The first transparent touch electrodes may be patterned so that the first transparent touch electrodes in each row are spaced apart from each other along a row direction. The second transparent touch electrodes may be patterned so that the second transparent touch electrodes in each column are spaced apart from each other along a column direction. The row direction intersects the column direction forming a plurality of intersections.

In some embodiments, the method further includes forming a first bridge layer having a plurality of first bridges and forming a second bridge layer having a plurality of second bridges. The first bridge layer and the second bridge layer may be formed by patterning a conductive material layer, e.g., by etching. The first bridge layer may be patterned so that two adjacent first transparent touch electrodes along the row direction are electrically connected at each intersection through a first bridge. The second bridge layer may be patterned so that two adjacent second transparent touch electrodes along the column direction are electrically connected at each intersection through a second bridge. Optionally, the second bridge layer is formed in a same layer as the first touch electrode layer and the second touch electrode layer. Optionally, the first bridge layer is formed in a different layer from the first touch electrode layer and the second touch electrode layer.

In some embodiments, the method includes forming a first bridge layer having a plurality of first bridges on a side of the insulating layer distal to the base substrate, e.g., in a same layer as the first touch electrode layer and the second touch electrode layer. Once the first bridge layer is formed, the method further includes forming an ancillary insulating layer on a side of the first bridge layer distal to the insulating layer. The purpose of the ancillary insulating layer is to insulate the first bridge layer from the second bridge layer, i.e., insulating each first bridge at each intersection from each second bridge at each intersection. Accordingly, the method further includes forming a second bridge layer having a plurality of second bridges on a side of the ancillary insulating layer distal to the first bridge layer. Each first bridge electrically connects two adjacent first transparent touch electrodes along the row direction at each intersection. Each second bridge electrically connects two adjacent second transparent touch electrodes along the column direction at each intersection.

When the touch substrate is a mutual-capacitance type touch substrate, the step of forming a plurality of vias in the insulating layer includes forming a first set of transparent touch signal lines connecting to the plurality rows of first transparent touch electrodes, and forming a second set of transparent touch signal lines connecting to the plurality columns of second transparent touch electrodes. Each transparent touch signal line in the first set corresponds to each row of the first transparent touch electrodes in a one-to-one relationship, and each transparent touch signal line in the second set corresponds to each column of the second transparent touch electrodes in a one-to-one relationship. For example, each transparent touch signal line in the first set is connected to each row of the first transparent touch electrodes through a via, and each transparent touch signal line in the second set is connected to each column of the second transparent touch electrodes through a via.

Figure 3A:
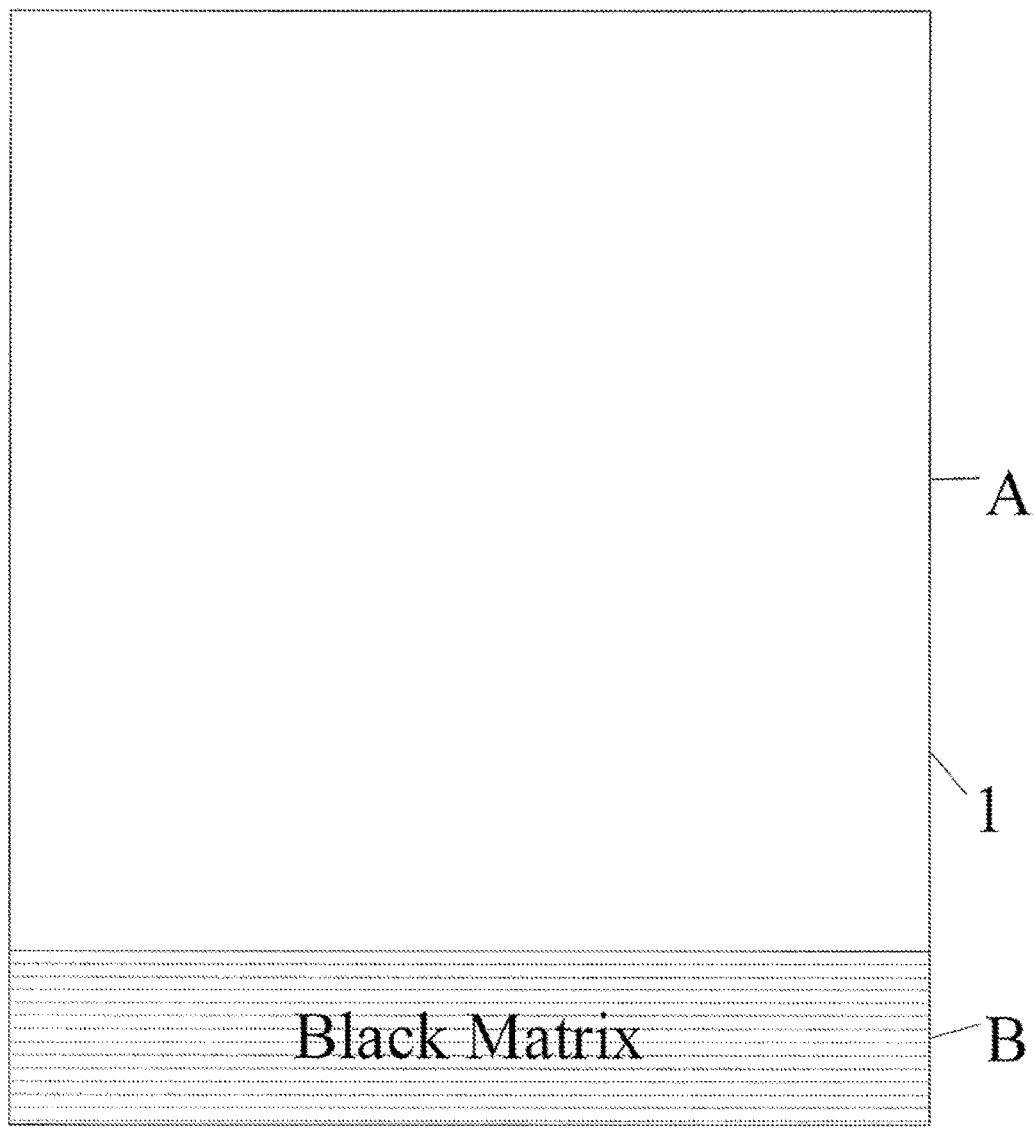
FIGS. 3A-3H illustrate a process of fabricating a touch substrate in some embodiments.

FIGS. 3A-3H illustrate a process of fabricating a touch substrate in some embodiments. Referring to FIG. 3A, the method of fabricating the touch substrate includes forming a black matrix in a peripheral area B of a base substrate 1. The base substrate 1 may be made of glass, quartz, polyimide, or polyester. The black matrix may be made of a black material such as a metal or metal, oxide (e.g., chromium or chromium oxide), a pigment-containing resin, etc.

Figure 3B:
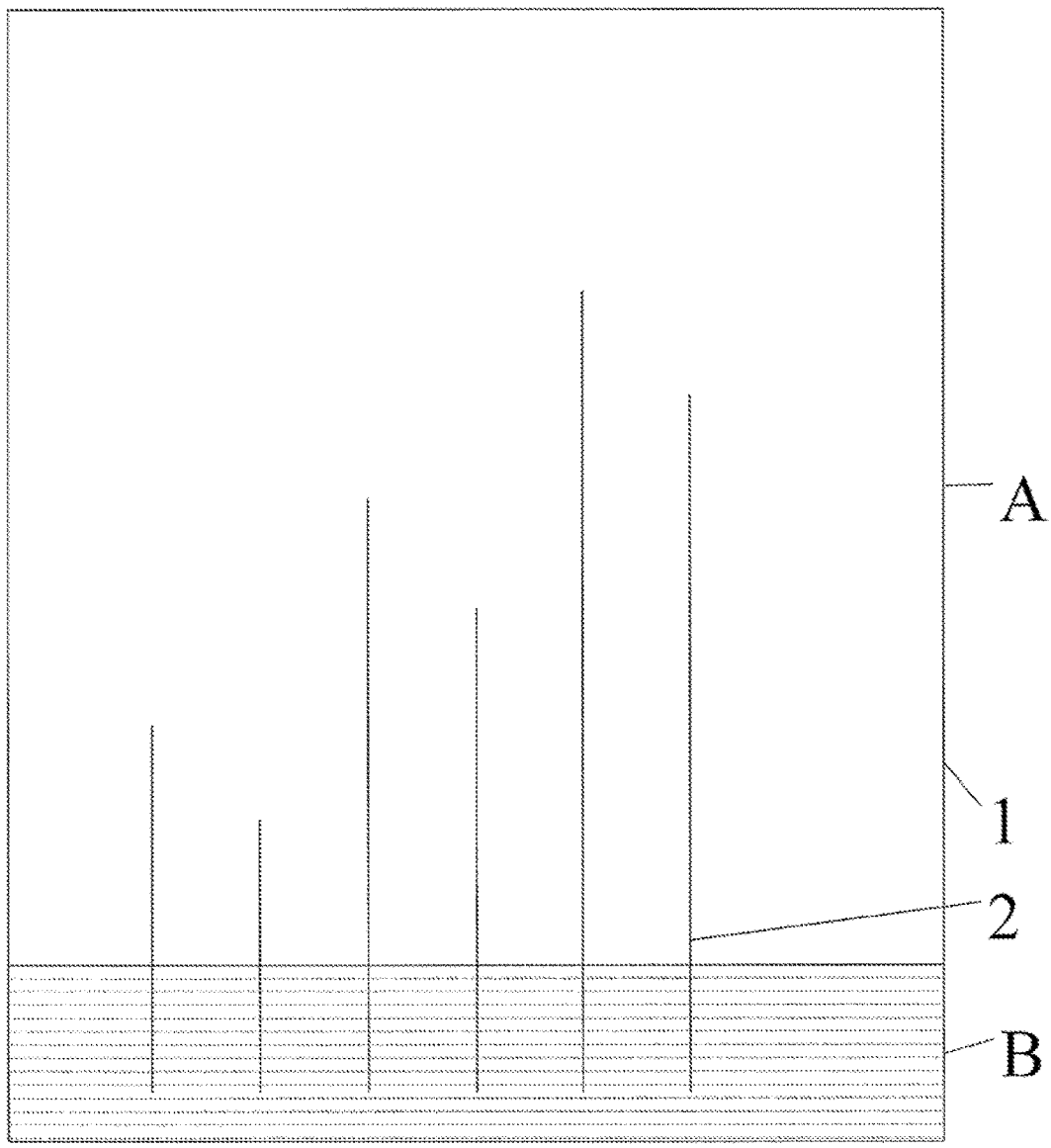

Referring to FIG. 3B, the method in the embodiment includes forming a touch signal line layer including a plurality of transparent touch signal lines 2 on the base substrate 1 in the display area A. As shown in FIG. 3B, the plurality of transparent touch signal lines 2 extend across at least a portion of the display area A into the peripheral area B (e.g., the black matrix area) for connecting the touch electrodes with a driving circuit in the peripheral area B.

In some embodiments, the step of forming the touch signal line layer includes forming a plurality of trenches on the base substrate, each of which corresponding to a transparent touch signal line 2, and depositing a transparent conductive material on the base substrate 1 to fill the plurality of trenches. For example, the step may include punch pressing the base substrate 1 to form the plurality of trenches, and filling the plurality of trenches with a transparent conductive material.

Examples of transparent conductive materials suitable for making the transparent touch signal lines include, but are not limited to, nano-silver, indium tin oxide, indium zinc oxide, indium gallium oxide, indium gallium zinc oxide, nano-carbon tube, and graphene. Optionally, the step of filling the plurality of trenches with a transparent conductive material includes filling the plurality of trenches with silver nano-paste. Optionally, the method further includes solidifying the silver nano-paste subsequent to the filling step.

Figure 3C:
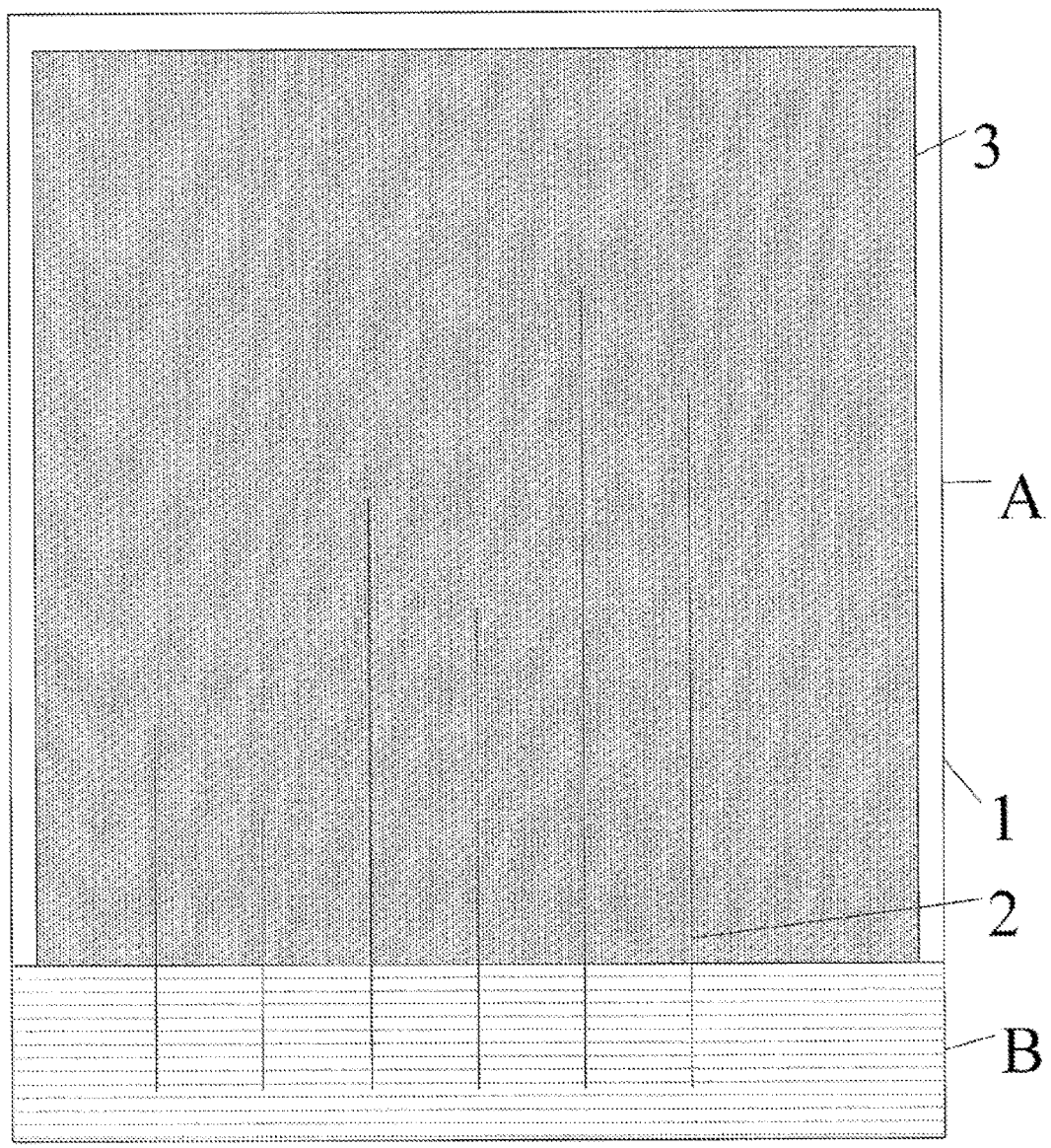

Referring to FIG. 3C, the method in the embodiment further includes forming an insulating layer 3 on a side of the touch signal line layer distal to the base substrate 1. The insulating layer 3 insulates the touch signal line layer from the touch electrode layer to be formed on the base substrate 1. Examples of insulating materials suitable for making the insulating layer 3 include, but are not limited to, a resin, a photoresist material, $SiO_x$ and $SiN_x$.

Figure 3D:
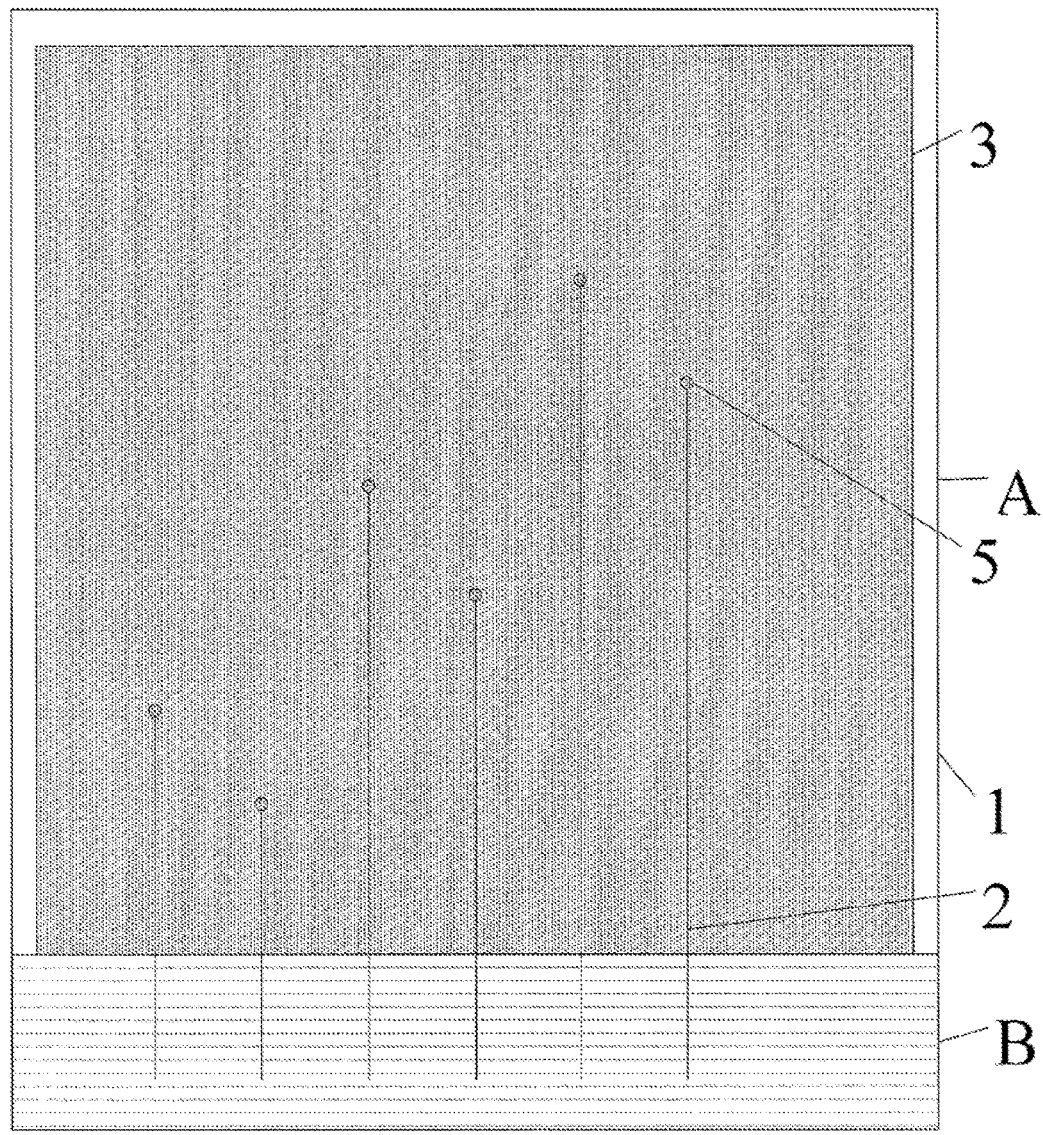

Referring to FIG. 3D, the method in the embodiment further includes forming a plurality of vias 5 in the insulating layer 3 for connecting the plurality of transparent electrodes with the plurality of touch signal lines 2. In some embodiments, the plurality of transparent touch signal lines 2 include a first set of transparent touch signal lines 2 and a second set of transparent touch signal lines 2. Each transparent touch signal line in the first set is connected to each row of the first transparent touch electrodes through a via, and each transparent touch signal line in the second set is connected to each column of the second transparent touch electrodes through a via. Accordingly, the step of forming the plurality of vias 5 may include forming a first set of vias 5 for connecting the first set of transparent touch signal line with the plurality rows of the first transparent touch electrodes, and forming a second set of vias 5 for connecting the second set of transparent touch signal line with the plurality columns of the second transparent touch electrodes.

For example, FIG. 3D shows six transparent touch signal lines 5. The first, third, and fifth transparent touch signal lines 5 may constitute the first set of transparent touch signal lines 5, and the second, the fourth, and the sixth transparent touch signal lines 5 may constitute the second set of transparent touch signal lines 5.

Figure 3E:
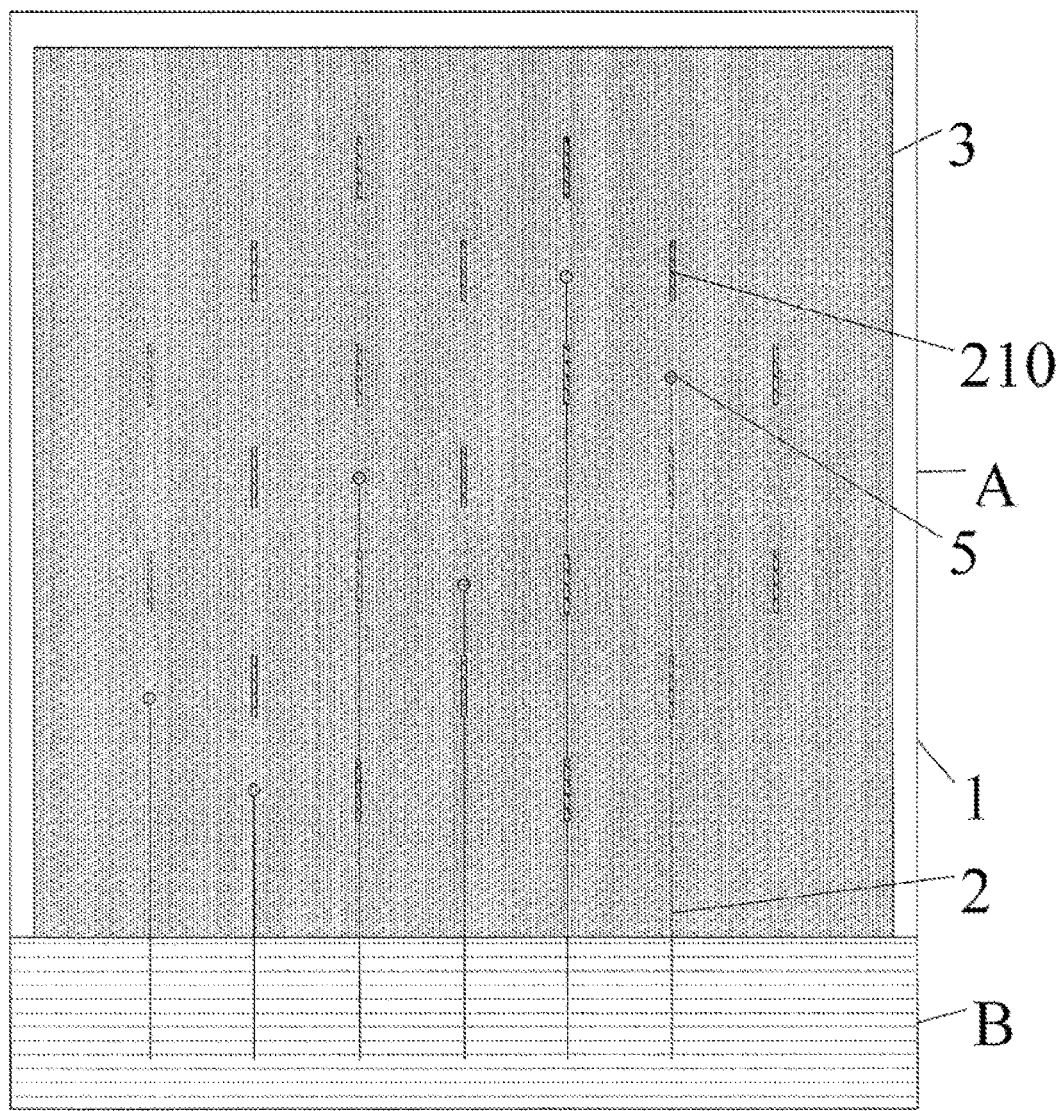

Referring to FIG. 3E, the method in the embodiment further includes forming a second bridge layer including a plurality of second bridges 210 on a side of the insulating layer 3 distal to the base substrate 1, each of which electrically connecting two adjacent second transparent touch electrodes along the column direction. Examples of conductive material suitable for making the second bridge layer include, but are not limited to, a metal, an alloy, a transparent conductive material such as indium tin oxide and nano-silver. Optionally, the second bridge layer is made of a transparent conductive material.

Figure 3F:
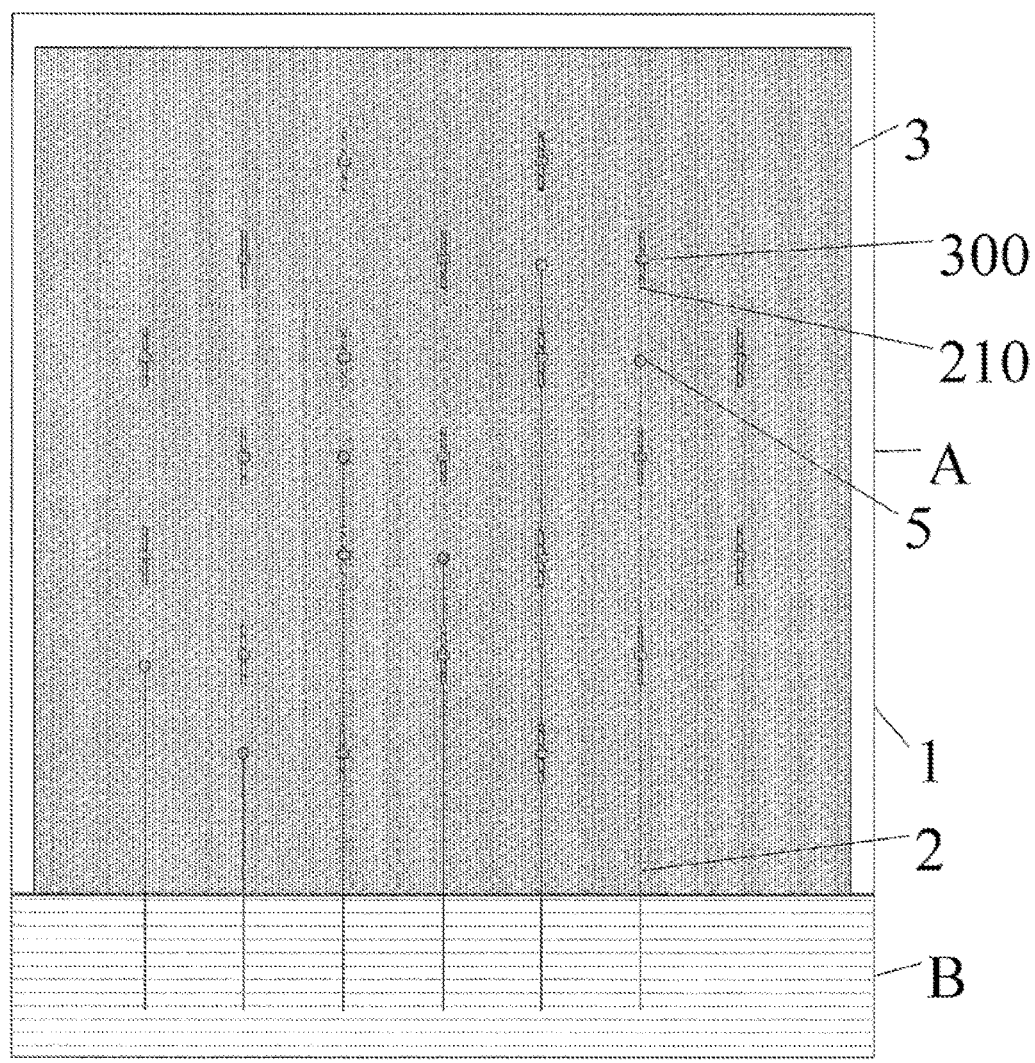

Referring to FIG. 3F, the method in the embodiment further includes thrilling an ancillary insulating layer 300 on a side of the first bridge layer distal to the base substrate 1. The ancillary insulating layer 300 includes a plurality of ancillary insulating blocks, each of which insulates a first bridge from a second bridge at the intersection of the row direction and the column direction. Examples of insulating materials suitable for making the ancillary insulating layer include, but are not limited to, a resin, a photoresist material, $SiO_x$ and $SiN_x$.

Figure 3G:
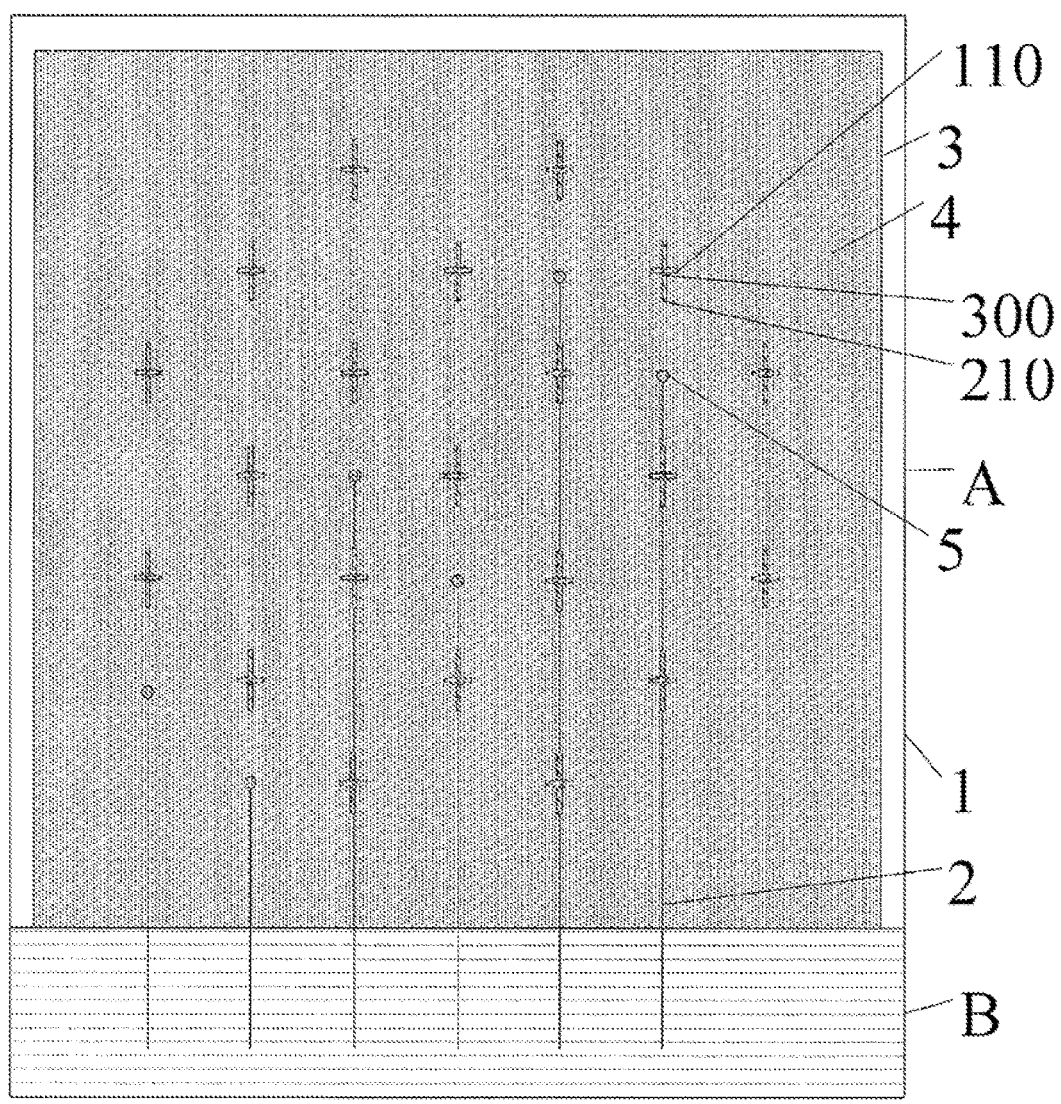

Referring to FIG. 3G, the method in the embodiment further includes forming a first bridge layer including a plurality of first bridges 110 on a side of the ancillary insulating layer 300 distal to the second bridge layer, each of which electrically connecting two adjacent first transparent touch electrodes along the row direction. Examples of conductive material suitable for making the first bridge layer include, but are not limited to, a metal, an alloy, a transparent conductive material such as indium tin oxide and nano silver. Optionally, the first bridge layer is made of a transparent conductive material.

Optionally, the first bridge layer may be formed in a single process with the first touch electrode layer, i.e., the process illustrated in FIG. 3G is not a separate step. For example, the first bridge layer is in a same layer as the first touch electrode layer, and the first bridge layer is formed together with the first touch electrode layer by patterning an electrode material layer thereby forming a pattern having a plurality of first touch electrodes connected by a plurality of first bridges 110. Optionally, the first bridge layer, the first touch electrode layer, and the second touch electrode layer are all in a same layer, and the first bridge layer is formed together with the first touch electrode layer and the second touch electrode layer by patterning an electrode material layer thereby forming a pattern having a plurality of first touch electrodes connected by a plurality of first bridges 110 and a plurality of second touch electrodes connected by a plurality of second bridges 210.

Figure 3H:
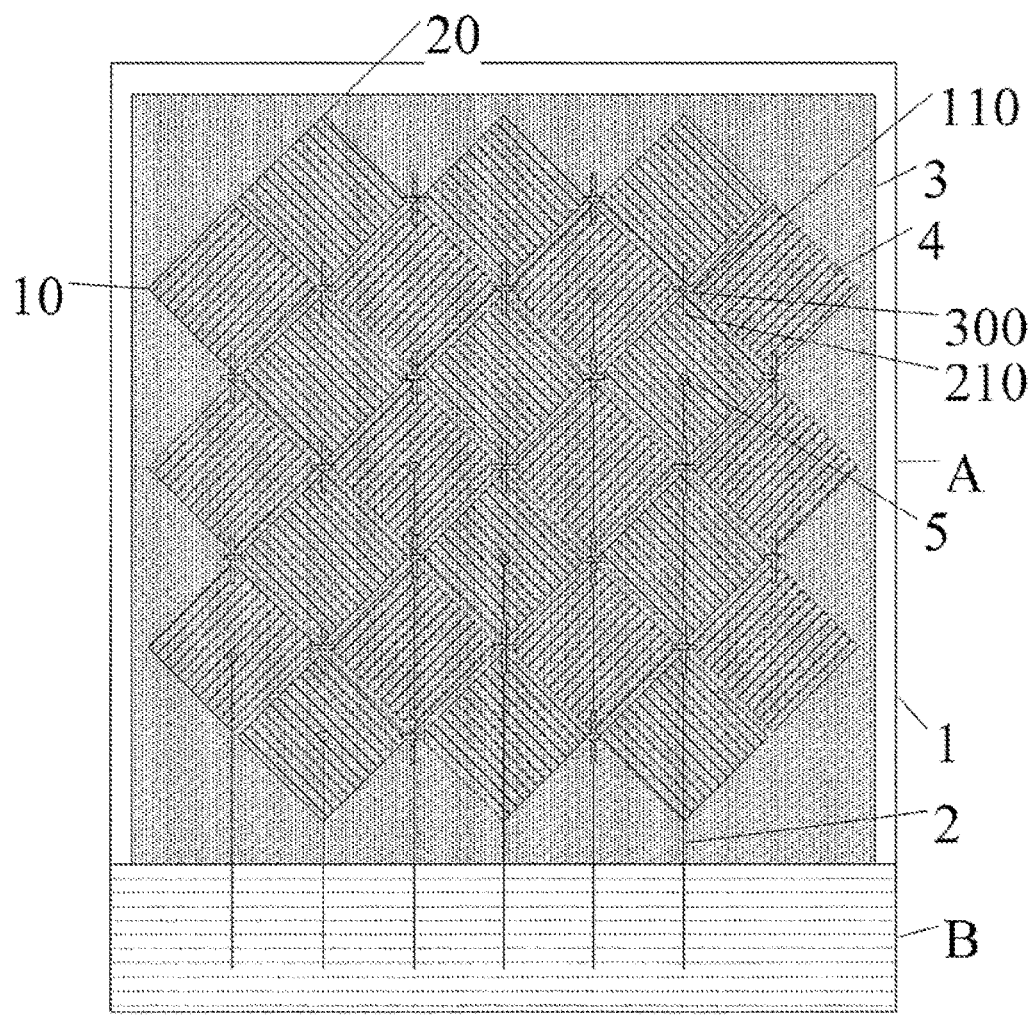

Referring to FIG. 3H, the method in the embodiment further includes forming a first touch electrode layer 10 and a second touch electrode layer 20. Optionally, the first touch electrode layer 10 and the second touch electrode layer 20 are formed in a same layer. Optionally, the first touch electrode layer 10 and the second touch electrode layer 20 are formed in different layers. As discussed above, this step may optionally include forming the first bridge layer in a same layer and in a same process as the first touch electrode layer 10.

As shown in FIG. 3H, the first set of transparent touch signal lines 5 (e.g., the first, the third, and the fifth transparent touch signal lines 5) are connected to rows of first touch electrodes, and the second set of transparent touch signal lines 5 (e.g., the second, the fourth, and the sixth transparent touch signal lines 5) are connected to columns of second touch electrodes.

In another aspect, the present disclosure provides a touch display panel having a touch substrate described herein or fabricated by a method described herein.

In another aspect, the present disclosure provides a touch display apparatuses having a touch display panel described herein. Examples of touch display apparatuses include, but are not limited to, an electronic paper, a mobile phone, a tablet computer, a television, a notebook computer, a digital album, a GPS, etc.

Figure 4A:
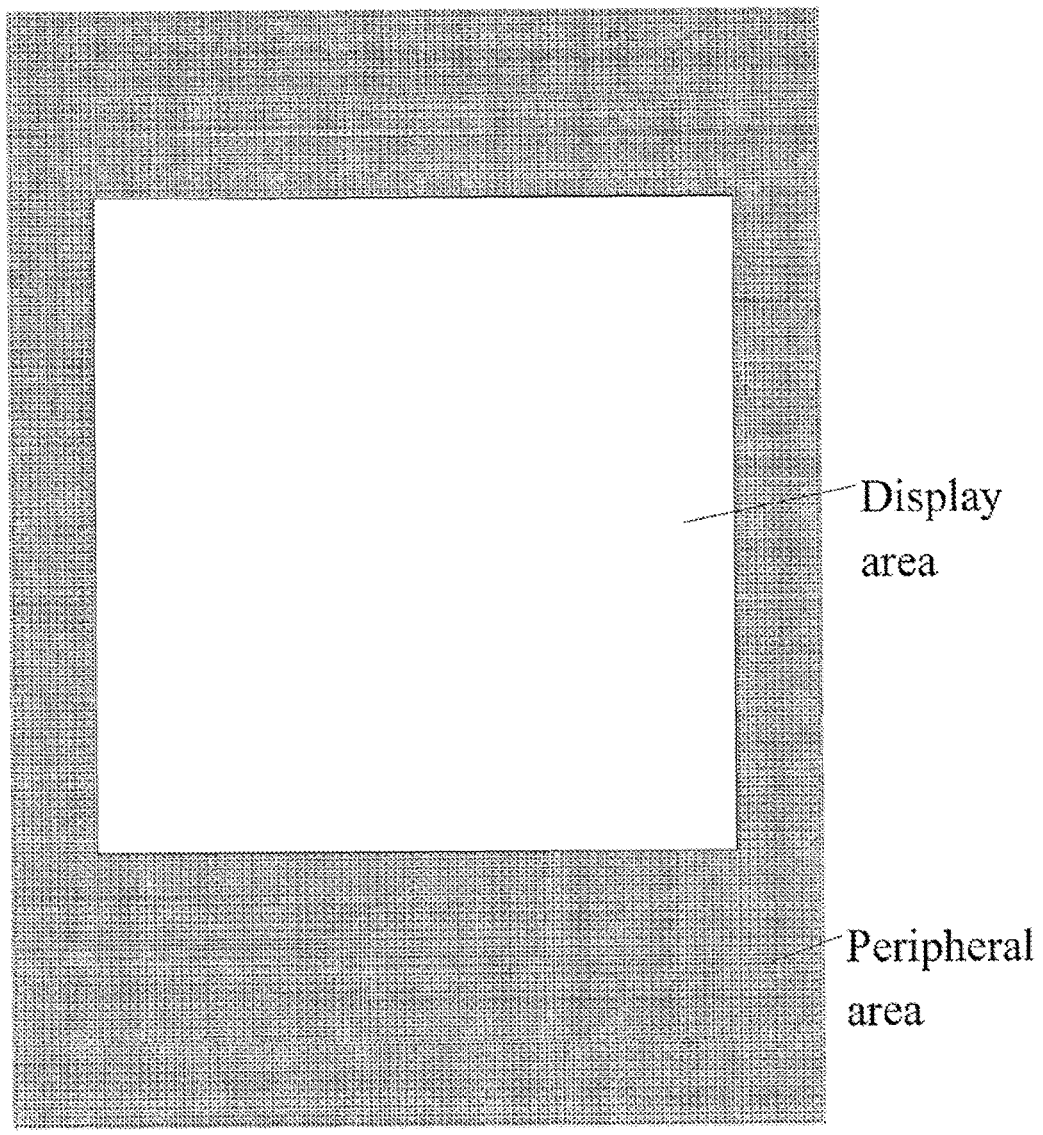
FIG. 4A is a diagram illustrating a conventional display apparatus.
Figure 4B:
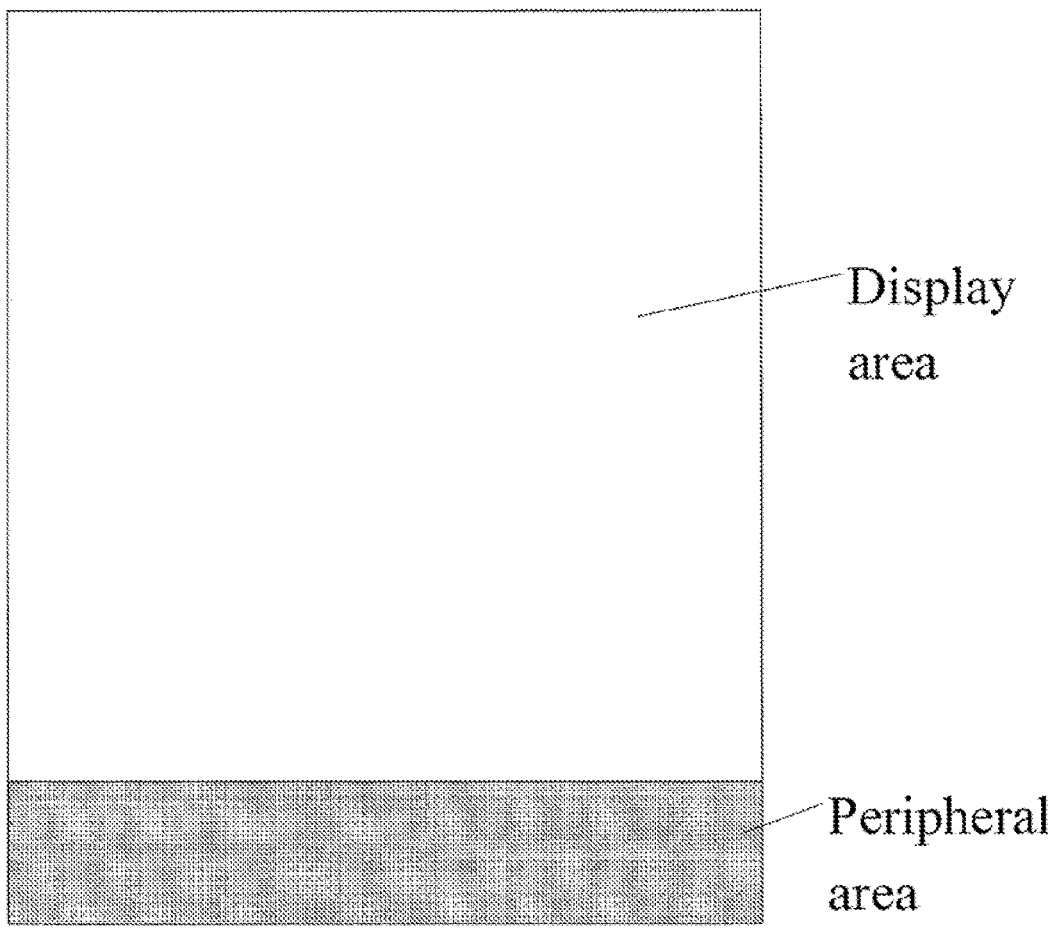
FIG. 4B is a diagram illustrating a display apparatus in some embodiments.
Figure 4C:
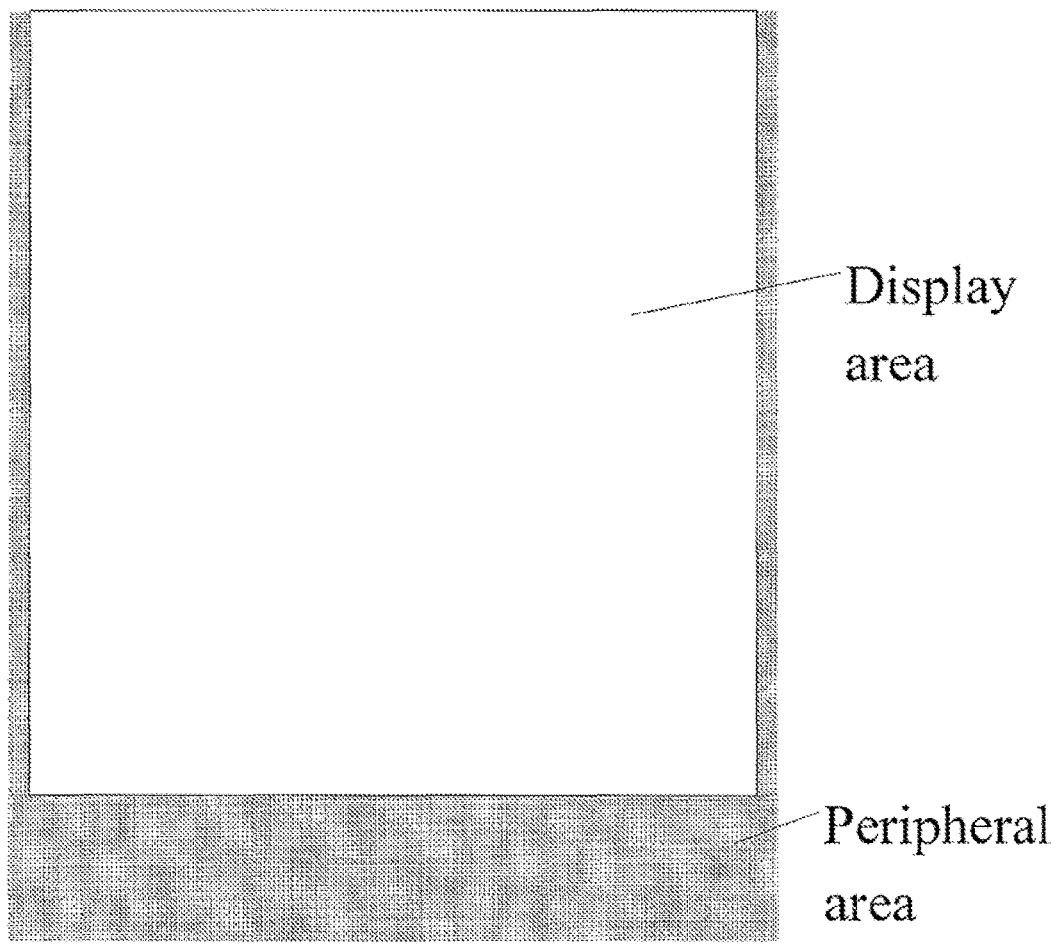
FIG. 4C is a diagram illustrating a display apparatus in some embodiments.

FIG. 4A is a diagram illustrating a conventional display apparatus such as a tablet. As shown in FIG. 4A, the conventional display apparatus requires a large bezel around all edges of the display area to cover the metal lines in the peripheral areas. FIG. 4B and FIG. 4C are diagrams illustrating display apparatuses in some embodiments. In the present display apparatuses, the touch signal lines, being transparent, extending across at least a portion of the display area and into the peripheral area, obviating the need for disposing touch signal lines around all edges of the display area. Thus, the present display apparatus needs a bezel along only one edge of the display area (FIG. 4B). For decorative purposes, a bezel may be included along other edges of the display area (FIG. 4C), however, the size of the bezel may be much reduced.

The foregoing description of the embodiments of the invention has been presented for purposes of illustration and description. It is not intended to be exhaustive or to limit the invention to the precise thrill or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate having a display area and a peripheral area abutting the display area for bonding circuit parts, comprising:
    a base substrate;
    a touch signal line layer comprising a plurality of transparent touch signal lines on the base substrate in the display area, the plurality of transparent touch signal lines extending across at least a portion of the display area into the peripheral area;
    an insulating layer on a side of the touch signal line layer away from the base substrate; and
    a touch electrode layer comprising a plurality of transparent touch electrodes in the display area on a side of the insulating layer away from the touch signal line layer;
    wherein the insulating layer comprises a plurality of vias, the plurality of transparent touch electrodes electrically connected to the plurality of touch signal lines through the plurality of vias in the insulating layer;
    a projection of the plurality of transparent touch signal lines on the base substrate overlaps with a projection of plurality of transparent touch electrodes in the display area;
    the touch electrode layer comprises a first touch electrode layer and a second touch electrode layer;
    the first touch electrode layer comprises a plurality of rows of first transparent touch electrodes;
    the second touch electrode layer comprises a plurality of columns of second transparent touch electrodes;
    a respective row of first transparent touch electrodes is electrically connected to one of the plurality of transparent touch signal lines; and
    a respective column of second transparent touch electrodes is electrically connected to one of the plurality of transparent touch signal lines.

2. The touch substrate of claim 1, wherein a respective of the plurality of transparent touch signal lines is individually addressable, and is electrically connected to a respective of the plurality of transparent touch electrodes through a respective of the plurality of vias in a one-to-one relationship.

3. The touch substrate of claim 1, wherein the touch electrode layer further comprises a first bridge layer comprising a plurality of first bridges and a second bridge layer comprising a plurality of second bridges;
    first transparent touch electrodes in the respective row are spaced apart from each other along a row direction; second transparent touch electrodes in the respective column are spaced apart from each other along a column direction; the row direction intersecting the column direction forming a plurality of intersections;
    two adjacent first transparent touch electrodes along the row direction are electrically connected at a respective intersection through a first bridge; and
    two adjacent second transparent touch electrodes along the column direction are electrically connected at the respective intersection through a second bridge.

4. The touch substrate of claim 3, wherein the second bridge layer is in a same layer as the first touch electrode layer and the second touch electrode layer; the first bridge layer is in a different layer from the first touch electrode layer and the second touch electrode layer.

5. The touch substrate of claim 4, further comprising an ancillary insulating layer between the first bridge layer and the second bridge layer, insulating the plurality of first bridges from the plurality of second bridges at the plurality of intersections.

6. The touch substrate of claim 1, wherein the plurality of transparent touch signal lines are made of one or a combination of nano-silver, indium tin oxide, indium zinc oxide, indium gallium oxide, indium gallium zinc oxide, nano-carbon tube, and graphene.

7. The touch substrate of claim 1, wherein the peripheral area is an area abutting only one side of the display area.

8. A touch display panel comprising a touch substrate of claim 1.

9. A touch display apparatus comprising a touch display panel of claim 8.

10. A method of fabricating a touch substrate having a display area and a peripheral area abutting the display area for bonding circuit parts, comprising:
    forming a touch signal line layer comprising a plurality of transparent touch signal lines on a base substrate in the display area, the plurality of transparent touch signal lines extending across at least a portion of the display area into the peripheral area;
    forming an insulating layer on a side of the touch signal line layer away from the base substrate; and
    forming a touch electrode layer comprising a plurality of transparent touch electrodes in the display area on a side of the insulating layer away from the touch signal line layer;
    wherein the step of forming the touch signal line layer comprises forming a plurality of trenches on the base substrate, each of which corresponding to a transparent touch signal line; and
    depositing a transparent conductive material on the base substrate to fill the plurality of trenches;
    wherein the step of forming the touch electrode layer comprises:
    forming a first touch electrode layer comprising a plurality of rows of first transparent touch electrodes; and
    forming a second touch electrode layer comprising a plurality of columns of second transparent touch electrodes;

the step of forming the plurality of vias in the insulating layer comprising forming the plurality of vias for electrically connecting a respective row of first transparent touch electrodes to one of the plurality of transparent touch signal lines; and electrically connecting a respective column of second transparent touch electrodes to one of the plurality of transparent touch signal lines.

11. The method of claim 10, further comprising forming a plurality of vias in the insulating layer for electrically connecting the plurality of transparent touch electrodes with the plurality of touch signal lines, wherein each of the plurality of vias corresponds to each of the plurality of transparent touch signal lines and each of the plurality of transparent touch electrodes in a one-to-one relationship.

12. The method of claim 10, further comprising:
forming a first bridge layer comprising a plurality of first bridges on a side of the insulating layer away from the base substrate;
forming an ancillary insulating layer on a side of the first bridge layer away from the insulating layer; and
forming a second bridge layer comprising a plurality of second bridges on a side of the ancillary insulating layer away from the first bridge layer;
wherein first transparent touch electrodes in the respective row are spaced apart from each other along a row direction; second transparent touch electrodes in the respective column are spaced apart from each other along a column direction; the row direction intersecting the column direction forming a plurality of intersections;
two adjacent first transparent touch electrodes along the row direction are electrically connected at a respective intersection through a first bridge; and
two adjacent second transparent touch electrodes along the column direction are electrically connected at the respective intersection through a second bridge.

13. The method of claim 10, wherein the peripheral area is an area abutting only one side of the display area.

14. The method of claim 10, further comprising printing a black matrix in the peripheral area.

15. The method of claim 10, wherein the plurality of transparent touch signal lines are made of one or a combination of nano-silver, indium tin oxide, indium zinc oxide, indium gallium oxide, indium gallium zinc oxide, nano-carbon tube, and graphene.

* * * * *